B. HAUSHEER.
CAP SOLDERING MACHINE.
APPLICATION FILED JUNE 7, 1912.

1,170,971.

Patented Feb. 8, 1916.
4 SHEETS—SHEET 1.

Witnesses:

Inventor
Bernard Hausheer attorney.

B. HAUSHEER.
CAP SOLDERING MACHINE.
APPLICATION FILED JUNE 7, 1912.

1,170,971.

Patented Feb. 8, 1916.
4 SHEETS—SHEET 2.

B. HAUSHEER.
CAP SOLDERING MACHINE.
APPLICATION FILED JUNE 7, 1912.

1,170,971. Patented Feb. 8, 1916.
4 SHEETS—SHEET 3.

Witnesses:
C. A. Jarvis
George H. Measures.

Inventor
Bernard Hausheer
Walter D. Edmonds
attorney.

UNITED STATES PATENT OFFICE.

BERNARD HAUSHEER, OF NORWICH, NEW YORK, ASSIGNOR TO BORDEN'S CONDENSED MILK COMPANY, OF NEW YORK, N. Y., A CORPORATION OF NEW JERSEY.

CAP-SOLDERING MACHINE.

1,170,971.  Specification of Letters Patent.  Patented Feb. 8, 1916.

Application filed June 7, 1912. Serial No. 702,154.

*To all whom it may concern:*

Be it known that I, BERNARD HAUSHEER, a citizen of the United States, and a resident of Norwich, in the county of Chenango and State of New York, have invented certain new and useful Improvements in Cap-Soldering Machines, of which the following is a specification.

My present invention relates more particularly to that class of cap-soldering machines employed to solder caps to cans previously filled with merchandise as for example condensed milk. These caps are circular to fit the corresponding circular flanged openings of said cans. The required solder and flux is supplied in any convenient manner to the joint between cap and flange, and thereupon the heated soldering tool having an annular operative edge corresponding with such circular joint is applied to the flux and solder thereon and rotated until soldering is accomplished.

My invention also particularly relates to such of the aforesaid class of machines as comprise a plurality of such soldering tools equally spaced apart and operating to simultaneously solder to a like plurality of cans a like plurality of caps, the cans being automatically fed and centered as required relatively to the tools, such machines, including their said feeding and centering means, being more particularly described and claimed in my Letters Patent No. 1,030,300, granted June 25, 1912.

The objects of my present invention comprise the overcoming of difficulties, and inoperativeness, hitherto encountered in this art, including particularly the more accurate than heretofore adjustment and rotation of the soldering tools relative to the seam, and the more uniform, economical, rapid, and effective heating of the irons, with less wear, and damage of the latter, than previously attained.

I attain these and other objects of my invention by the novel mechanisms and combinations of elements illustrated in the accompanying drawings, in which—

Figure 8:
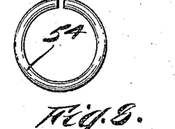
Fig. 8 is a detail view showing on enlarged scale a ring of solder adapted to be used with my improved irons.

My present improvements are herein shown as incorporated and operated in an organized machine comprising standards 1 (Figs. 1 and 2) which support rails 2, which support rollers 3, upon which a tray 4 dimensioned to loosely carry a plurality of like cylindrical cans 5, in this instance sixteen in number, which are placed therein by hand, is manually shoved forward to the required position for soldering. The top of each can contains a therewith concentric round opening 5' (see Fig. 9) the edge of which is provided with a circumferential flange $5^2$ upon which has been placed loosely a circular cap $5^3$. To the joint, between cap and can, flux and unmolten solder are supplied in any convenient manner, as, for instance, the solder by placing a ring thereof $5^4$ (see Figs. 8 and 9) as hereinafter more fully described.

Above the location at which the cans are centered and stopped by means hereinafter described I support my improved vertically movable soldering devices comprising a gas-conduit-containing, and heat-blanketing carrier 6, passing loosely through which are accessory parts hereinafter described of my vertically, rotatory like, equally-spaced-apart, soldering irons 7, equal in number to the cans treated, *i. e.* in this instance sixteen.

The carrier 6 is hung upon blocks 8 slidably supported on the vertical guide rods 9. Vertical upward movement is imparted to said blocks by the chains 10 (see Fig. 2) passing around the pulleys 11 carried by the shaft 12 rotatably mounted in the brackets 13 carried by rails 14 secured to the standards 1, the shaft 12 being rotated as desired by the operator's turning of the thereto secured hand wheel 15. The carrier and its therein embodied or therewith connected elements are counter-balanced by the weight 16 suspended from the free ends of the chains 10.

Figure 1:
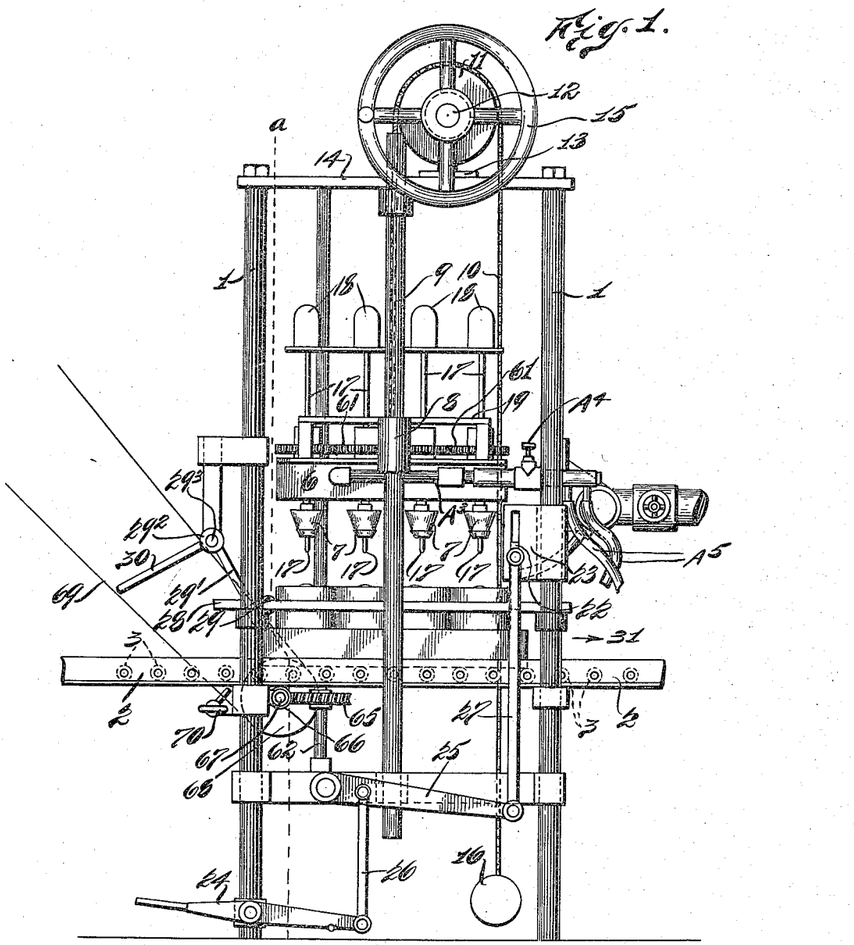
Figure 1 is a side elevation of one of my machines comprising my herein claimed improvements.
Figure 2:
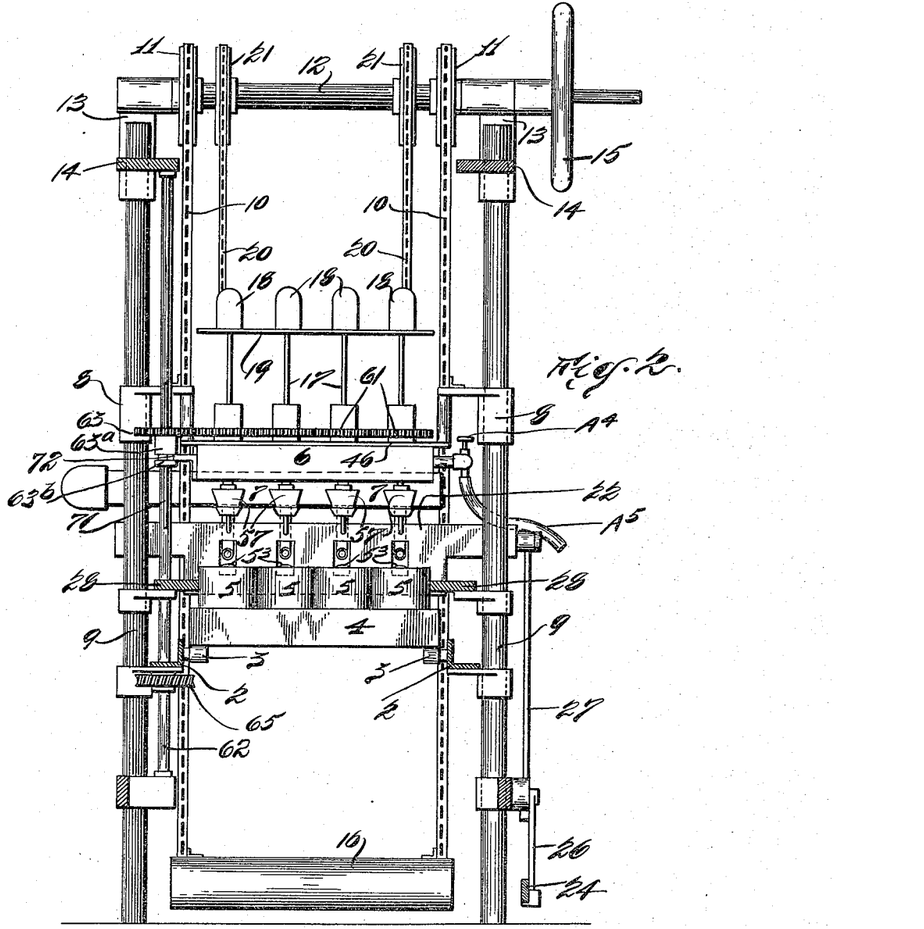
Fig. 2 is an end elevation, shown partly in section on the dotted line *a—a* of Fig. 1, viewed in the direction of the arrow *a'* of the latter figure.

Means are provided to hold the caps down upon the cans during operation of the soldering irons, towit, holding rods 17 carrying at their upper extremities weights 18. Said rods pass slidably through a plate 19 upon which the weights normally rest when the rods are out of contact with the caps. The plate 19 is suspended by connection with the ends of the chains 20 the opposite ends of which are secured to the pulleys 21 carried by the shaft 12. The rods 17 are alike and disposed equally-spaced-apart so as to center with the center of the caps when the cans have been centered and stopped in location below them by the following means, viz:—Extending transversely of the path of the cans through the machine I provide a normally closed, vertically movable gate 22 slidably supported in a pair of like guides one of which 23 is shown in Fig. 1. The gate is raised when required by any convenient means as for example by aid of a treadle 24 intermediate lever 25 and links 26 and 27, which are sufficient if the gate be as that intended to be shown in the drawings not to exceed twenty inches wide, or if wider a similar train of intermediate lever and links may connect the other end of the gate with the treadle as will be readily understood. The horizontal distance between the inside of the gate and the central vertical axis of the holding rods nearest thereto is one-half the horizontal diameter of the cans. It will be noted that, as shown in Fig. 1, the gate when closed extends in the path of the cans and not of the tray. Lateral parallel guide rails 28 are stationarily supported each side the path of the cans, the distance between said rails being equal to the sum of the diameters of the number of cans capable of passing therethrough abreast in a rank rectangular to said rails.

As the tray is pushed by the operator toward the soldering devices the rails influence the cans, loosely carried by the tray, toward positions in which their centers will register with the centers of the holding rods. The gate, when the cans contact it, coöperates with the rails to aline the first rank of cans in said positions, and if the tray be sufficiently advanced its rear side engaging with the rear rank of the cans, and coöperating with the gate and the guide rails will force the remainder of the cans into said positions, but to enable unskilled labor to center the cans with greater certainty I prefer to provide a movable bar 29 (see Fig. 1) disposed normally transverse the path of the cans, and pivotally supported by a plurality of like arms (one of which 29' is shown in Fig. 1) said arms being carried by a sleeve $29^2$ rotatably carried by the horizontal shaft $29^3$ secured to a stationary part, and said sleeve provided with a handle 30 preferably weighted to impart pressure to the bar against the cans when positioned as shown in Fig. 1. By means of the handle the operator turns the bar out of the path of the cans as the latter are forced into the machine;—after they are stopped by the gate the operator reverses his turning of the bar thus enabling it to contact with the last rank of cans, when it coacts with the lateral guide rails and with the stop to bring all the cans into required position and if the handle 30 is as aforesaid weighted sufficiently will hold the cans in said position during operation of the soldering tools. It will be noted that the operative face of the bar 29 relatively to the cans is beveled as shown in Fig. 1 whereby its pressure against the cans is gradually applied. After the soldering operations are completed the gate 22 is raised and the tray 4 and its contained cans 5 moved out in the direction of the arrow 31 (Fig. 1). It will of course be understood that other devices and methods for feeding the cans to the soldering devices and centering and holding them thereunder might be employed.

Figure 3:
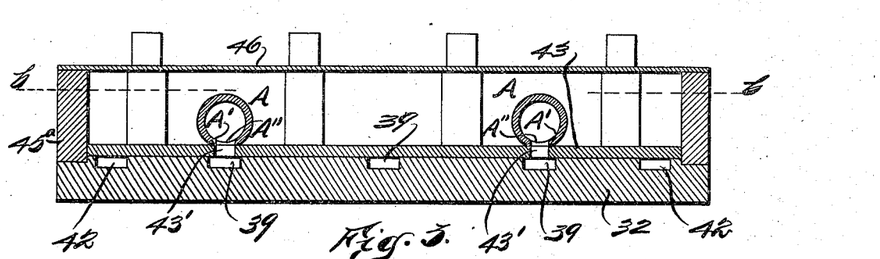
Fig. 3 is a detail cross-sectional view, on enlarged scale, of my carrier, illustrating in part my therein embodied means for insuring more uniform supply of gas to the plurality of burners.
Figure 4:
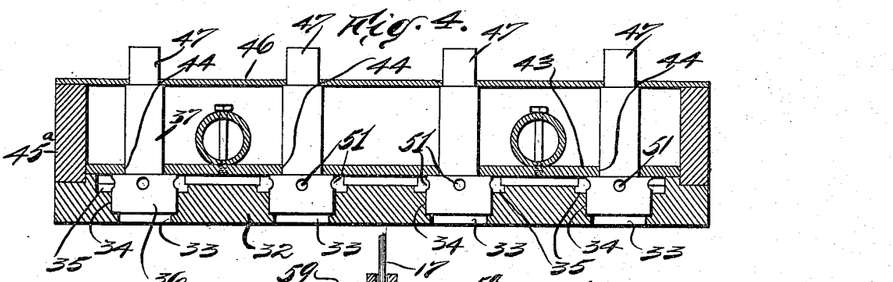
Fig. 4 is a similar view, on same scale as Fig. 3, showing also details of construction of my burner-supporting and tool-influencing thimbles or sleeves.
Figure 6:
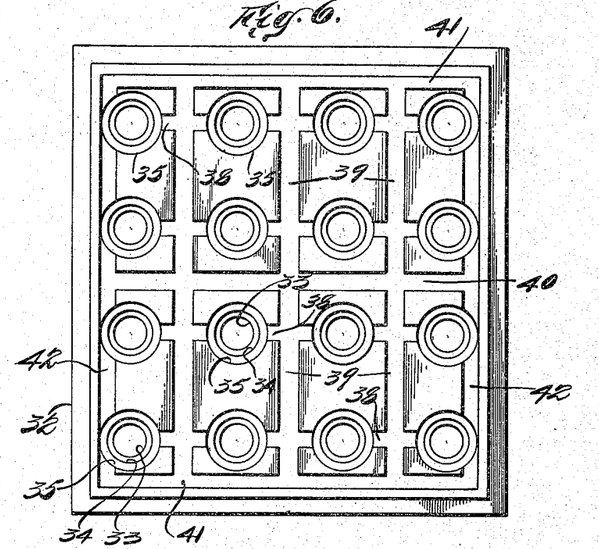
Fig. 6 is a plan of the bottom member or plate of my carrier showing my therein embodied arrangement of conduits for insuring more uniform supply of gas to the burners.
Figure 7:
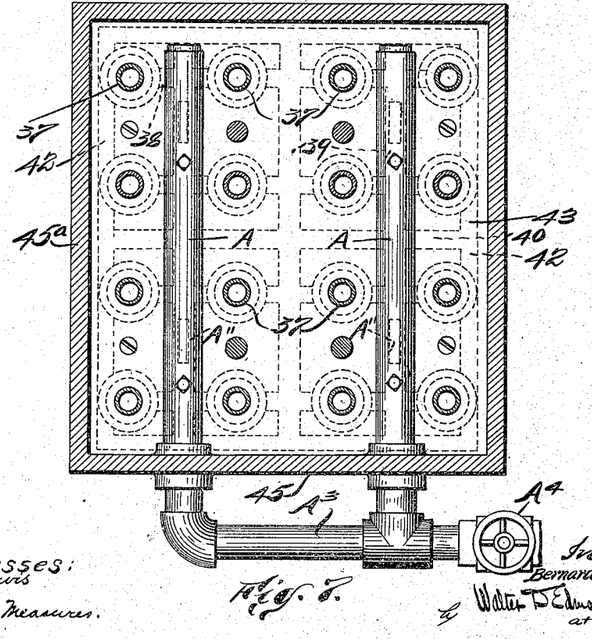
Fig. 7 is a plan of my said carrier, its contents and their connections as they appear below the sectional line *b—b* of Fig. 3.

Referring now to my improved soldering devices proper, one of the principal objects of my present invention has been provision of means whereby required uniformity of gas supply can be insured to the considerable plurality of burners required to simultaneously solder a like plurality of caps, also maintenance of the temperatures as required, and substantially uniformly, throughout the entire group of burners and their associated soldering tools. This I accomplish by my novel vertically movable carrier-box 6 and its constituent members comprising heat conductive, associated with comparatively insulating, portions, and gas conduits and chambers, all dimensioned and arranged to impart substantially equal gas pressure at each burner and equal temperature to each soldering-tool. My carrier-box includes a bottom plate 32 composed of iron or other well-conducting material (see Figs. 4 and 6) and having openings 33 surrounded by counter-bores 34, and also counter-bores 35. Each counter-bore 34 receives and supports the cylindrical head 36 of a thimble 37 hereinafter more fully described. Referring to Figs. 6 and 7, it will be noted that the counter-bores 35 are connected with each other by channels 38, countersunk in said plate and disposed in parallelism with each other; also that the channels 38 are, in turn, connected with each other by channels 39 disposed in parallelism with each other and at right angles to the channels 38; also that the channels 39 are connected together by channels 40 and 41 disposed at right angles thereto; and finally that the channels 39 are connected with the channels 41, the channel 40 with channels 42 and with channels 39 respectively at right angles to each other, and that, the channels 42 are also connected with the counter-bores 35 thereto adjacent. To enable the said channels to serve as conduits for gas, or other combustible, I provide a cover plate 43 (see Figs. 3 and 4) which is secured in any convenient manner to the said bottom plate 32. Said cover plate is provided with openings 44 through which pass the thimbles 37 which are thus firmly locked in position by the two plates (see Fig. 5.)

My carrier-box also includes the side members 45, 45ª (Figs. 3, 4 and 7) secured in any convenient manner to the bottom plate; and also, secured to the said side members, a top plate 46 which completes the boxing in of my carrier, and stays and supports the therethrough passed reduced portions 47 of the thimbles 37, said plate bearing upon the shoulders of the latter resulting from the reduction of diameter, the thimbles being thus further strongly braced and maintained in their required relative positions. The heads 36 of the thimbles fit snugly in the counter-bores 34 and the thimbles are at all times stationary relative to the plates. It follows from the foregoing construction that the counter-bores 35, when the cover plate 43 has been secured to the bottom member, constitute annular chambers adapted for accumulation and passage of the gas thereto fed in opposite directions through the channels above described.

Figures 5, 11:
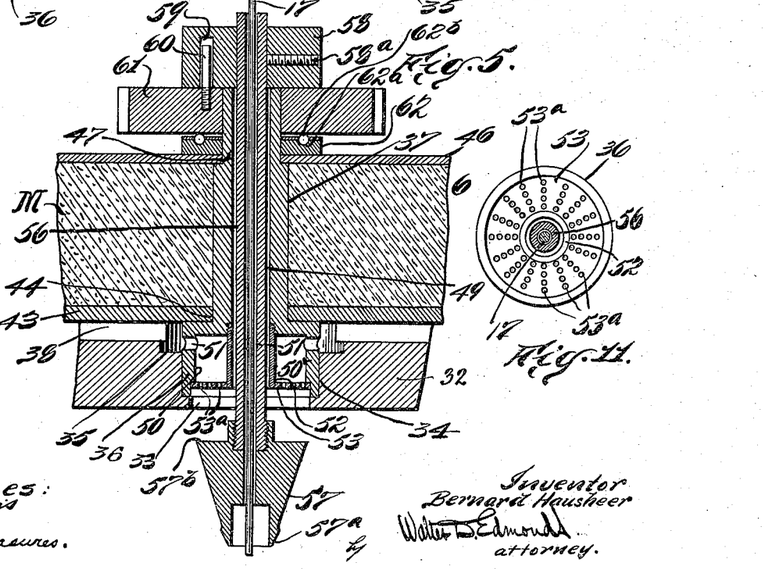
Fig. 5 is a central vertical sectional view on still larger scale showing one of my improved soldering tools and its therewith combined burner, gas supplying conduits, holding rod and means for imparting rotation.
Fig. 11 is a plan of the under portion of one of the burners showing the therewith interiorly concentric elements in horizontal cross-section.

Referring now more particularly to Fig. 5 it will be noted that the thimble 37 therein shown (being a counterpart of the other like thimbles) comprises a therethrough extending circular bore including, in the head of the thimble, a counter-bored portion 50 of greater horizontal diameter than that of the remainder of the bore which extends through the shank portion of said thimble as at 49. The counter-bore 50 communicates with the aforesaid annular gas chamber 35 through a plurality of oppositely disposed gas inlets 51 in the wall of the head of said thimble and is constituted into an annular gas chamber 50', within the burner thus provided, by means of the cylindrical bushing 52 carried by and concentric with the thimble, and the disk-shaped horizontally disposed nozzle plate 53 secured to the bushing and the thimble and provided with a plurality of downwardly delivering gas vents 53ª (see Fig. 11), the aggregate aperture of which is preferably less than that of the said inlets 51.

Gas, or other combustible fluid, is conducted to the channels, or conduits, 38, 39, 40, 41, and thence to the chambers 35 openings 51 and chambers 50' through ducts A flattened as at A' (Fig. 3) to fit upon the plate 43. The ducts A are provided with openings A'' which aline with similar openings 43' in the plate 43 alining with two of the channels 39 (see Figs. 3 and 7). The gas passes into the ducts A through the therewith connecting supply pipe $A^3$ under pressure controllable by a valve $A^4$ said pipe being movably connected by flexible tubes $A^5$ (Fig. 1) with stationary conduits from a supply under pressure, not shown, and the plurality of burners being thus fed from a single thereto common source.

Between the upper plate 46 and the plate 43 I fill or pack the interstices of my carrier-box 6 with some temperature-insulating material M (Fig. 5), asbestos, for instance, which, owing to its character and position, acts as a blanket to not only prevent losses of temperature through upward radiation but also to intensify and equalize the temperature where most required throughout all the burner zone.

The metallic plate between the burners, owing to its horizontal disposition and being non-conductively blanketed above, conducts the accumulated heat laterally in all directions toward the outermost burners thus compensating their greater exposure to the normal outer temperature, the result being that substantially equal temperature is imparted to all the tools. The aforesaid construction results in supplying to all members of the entire group of burners simultaneously a substantially equal amount of gas at substantially uniform pressure, whereby required equality of high temperature and effectiveness is promoted at all times, thus enabling a plurality of caps to be properly soldered to the cans within substantially the same given time which is particularly important when, as here, pluralities are to be simultaneously treated.

Referring now particularly to Fig. 5, it will be seen that my vertically disposed soldering-tool, composed, as usual, preferably of iron, has a therethrough extending and therewith concentric circular vertical bore, and comprises a medially extending cylindrical shank or spindle portion 56, which passes so loosely through the bore 49 of the thimble 37 as to be, relatively thereto, not only vertically and rotatively, but also, in all directions, slightly horizontally movable, the thimble being thus disposed around, and spaced-apart from, the shank of the soldering-tool sufficiently to permit transverse horizontal movements thereof and to limit undesired excess of such movements. My said soldering-tool also comprises a soldering-head portion 57 preferably removably secured for interchangeability to said spindle portion. This head of my soldering-tool comprises an annular downwardly-presented cross-sectionally tapering operative edge 57$^a$, and, above said edge, a thereto relatively expanded upwardly and horizontally presented heatable surface 57$^b$ disposed below the said gas vents 53 of one of my said burners, the relation of such surface to the burner being such that the flames from the latter are projected downwardly toward said surface. My said soldering tool also comprises an upper weight-making cylindrical expanded portion 58 sleeved upon and adjustably secured to the shank 56 by a set-screw 58$^a$, the purpose of such adjustability being to regulate as required the normal distance between the surface 57$^b$ and the burner vents 53. 58 comprises a therein bored socket 59 which loosely receives a pin 60 carried by a gear 61 rotatably mounted upon, and concentric with, the reduced portion 47 of the stationary thimble 37. The gear 61 is rotatably supported upon an anti-friction support 62 comprising a usual circular half-round countersunk channel 62$^a$ concentric with said thimble in which roll the anti-friction balls 62$^b$ upon which bears the part 61. The pin 60 is fitted so loosely in the socket 59 as to permit not only relative vertical, but also some horizontal, movement, between the parts at all times including that of the rotation of the soldering-tool, which follows from the construction, whenever the gear is rotated. The socket, 59, being bored as stated results in its constantly opposing to the pin, 60, a uniformly curved actuating surface, which is of advantage in that the permitted horizontal, transverse, movements and displacements of the operative edge of the soldering-tool are, owing to the socket and its said shape, promptly, but graduatedly rectified, thus enhancing the smoothness and air-tightness of the ironed solder-seam. It will be understood that the relative positions of the socket, 59, and the pin, 60, might, though unpreferably, be reversed, i. e. the socket contained in the gear, 61, and the pin carried by the enlarged portion, 58, without departing from my invention.

Figure 10:
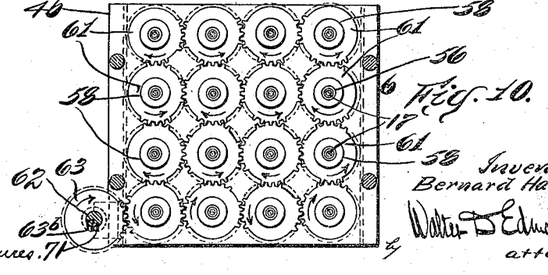
Fig. 10 is a detail plan illustrating the manner of connecting up the plurality of gears instrumental in the simultaneous rotation of the group of soldering irons.

By reference to Fig. 10 it will be seen that each gear 61 thus connected with each soldering-iron intermeshes with a like gear similarly connected with each adjacent soldering-iron. I impart rotation in unison to the entire group of gears by means of a driving gear 63 (Figs. 2 and 10) slidably mounted on the vertical rotatable shaft 62 carrying the worm-gear 65 actuated by the worm 66 (Fig. 1) carried by the shaft 67 rotated by a pulley 68 and belt 69 whenever a belt-shifter 70 is caused to move the belt onto the pulley 68 from a loose pulley, not shown. The gear 63 has a hub 63$^a$ having a slot within which slides vertically the key 71 carried by the shaft 62. A fork 72 secured to the carrier 6 straddles a circumferential groove 63$^b$ in the hub 63$^a$ whereby vertical movements of the carrier are communicated to the gear 63.

Figure 9:
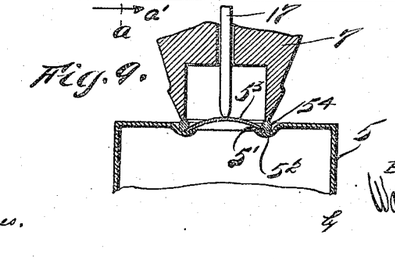
Fig. 9 is a detail central sectional view of my soldering tool, a ring of solder, a cap and the upper portion of a can, indicating relative relation of each to the other during soldering.

The operation is as follows: Cold solder may be supplied to the joints and tools by any of the well-known means, likewise required flux. These I have not described because too well understood in the art, but my preferred method of supplying solder for use with my above described cap-soldering tools is that invented by me but not covered by my claims in my present application for patent, namely, by application to each joint, before the soldering operation, of a preliminarily prepared ring 54 (Fig. 8) of solder of required shape to overlie the circular joint, with the can, of the particular caps treated, as shown in Fig. 9, and gaged in amount to supply as nearly as possible the amount of solder required. The joints being thus supplied with cold solder and, by any convenient means, with sufficient flux, the group of cans is centered beneath the corresponding group of soldering tools as before described. The gas pressure being properly regulated and the burners ignited, the operator lowers the cap-holding rods 17, and, in unison therewith the carrier box 6, by turning the hand wheel 15 as above described. This, inasmuch as the lower extremities of the rods while suspended project downwardly in advance of the other thus lowered members, first brings said rods to contact with the caps which are thus held down upon the cans. After the descent of the rods is thus stopped further turning of the hand wheel enables the carrier box, which normally supports the soldering tools to continue its gravity descent until the soldering tools contact with, and their descent is thus stopped by the underlying cans, caps and solder. The turning of the hand wheel being still continued the carrier-box is thus further lowered sufficiently to enable the weighted portions 58 to exert their full gravity pressure on the tools. The operative annular edges of the soldering-tools melt the solder and in settling thereinto adjust themselves to correct positions relatively to the joints, this extremely important result being attained by reason of their aforesaid capacity for horizontal movement within the thimbles. It will be noted that said lowering of the carrier-box also diminishes the distance between the burners and the thereby heatable upwardly disposed surfaces of the soldering-tools, whereby the heating of the operative edges is increased in proportion to the extent the carrier box is thus lowered until further lowering is resisted by contact with the expanded upwardly presented surfaces 57$^b$ of the tools. This not only intensifies the soldering temperature when required but at other times comparatively, and desirably, exempts the edges from such high temperatures. It is important that the operator shall wait, at this stage, until the solder has thus been entirely melted. This accomplished, the operator turns on the power, whereby the soldering-tools are, as aforesaid, simultaneously rotated. This rotation is allowed to continue until the solder has been sufficiently ironed to produce perfect seams. The capacity of the tools for horizontal movement is also particularly important during their rotation, since they are thereby enabled to find the joint and seam, and to bear where required. It is difficult, if not impossible, to prevent more or less warping of such tools except at their operative edges and my invention not only safeguards these, but also enables very considerably warped tools to operate successfully.

After the soldering is complete, the operator turns the hand wheel 15 in the reverse direction, whereby the carrier-box is firstly raised lifting with it the soldering-tools and at a greater distance from the burners than during the soldering operation the raising of the rod follows, the tray containing its group of completed cans is moved out, and the machine is ready to repeat the operation on the next group of cans and caps inserted.

What I claim as new and desire to secure by Letters Patent is the following, viz:—

1. In a machine of the class described, a vertically movable thimble containing a vertically extending bore; a soldering tool having an annular operative edge and comprising a shank upwardly extending therefrom through, and normally without contacting, said bore; means to prevent said thimble from moving horizontally relatively to said shank; a gear concentric with, and horizontally rotatable independently of, said thimble; an upwardly-projecting pin carried by said gear; and, carried by said shank, a part projecting radially beyond said bore and comprising a socket containing said pin and so dimensioned as to enable said part, shank, and tool, to move universally-horizontally an equal distance relatively to said pin, gear, and thimble.

2. In a machine of the class described, having a pathway for a can, a rotatable, vertically, and universally-horizontally, movable soldering-tool comprising a therefrom upwardly extending shank carrying a part containing a downwardly presented socket; movable vertically relatively to said tool a member carrying a thimble disposed around and spaced-apart from said shank sufficiently to permit horizontal movements of the shank relatively thereto; means to prevent said member and thereby carried thimble from moving horizontally; vertically-movably supported intermediate said thimble-carrying member and said part of said shank a horizontally rotatable gear concentric with said thimble and carrying an upwardly projecting pin of smaller dimensions than, and extending within, said socket; means to lower said tool and thimble-carrying member until further descent of the tool is resisted by a can in said pathway, and to further lower said member relatively to said tool; and means to rotate said gear.

3. In a cap-soldering machine, an uprightly disposed, vertically, horizontally and rotatively movable soldering tool having a therethrough-extending, therewith-concentric, vertical bore and comprising a downwardly-presented operative edge and an upwardly extending shank; extending through said bore a thereto relatively vertically movable cap-holding rod dimensioned to admit horizontal movements of said tool relatively thereto; encircling said shank a thimble vertically movable relatively to said tool and rod and interiorly dimensioned to admit horizontal movements of said shank therein; means to vertically-movably suspend said thimble; means to, by aid of said thimble, vertically-movably suspend said tool; means to vertically-movably suspend said rod; means to, by aid of gravity, lower in unison said thimble, tool and rod until further descent of the rod is resisted by a can, to further lower in unison said thimble and tool until further descent of the tool is resisted by said can, and to thereafter further lower said thimble; and means to rotate said tool.

4. In a cap-soldering machine, a plurality of uprightly disposed, vertically, horizontally and rotatively movable soldering tools each having a therethrough-extending therewith-concentric, vertical bore and comprising a downwardly-presented operative edge and an upwardly extending shank; extending through each said bore a thereto relatively vertically movable cap-holding rod dimensioned to admit horizontal movements of the tool relatively thereto; encircling each said shank a thimble vertically movable relatively to the tool and rod and interiorly dimensioned to admit horizontal movements of the shank therein; means to vertically-movably suspend in unison said thimbles; means to, by aid of said last mentioned means, vertically-movably suspend in unison said tools, means to vertically-movably suspend in unison said rods; means to, by aid of gravity, lower in unison said thimbles, tools and rods until further descent of each rod is resisted by a can, to further lower in unison said thimbles and tools until further descent of each tool is resisted by a can, and to thereafter further lower in unison said thimbles; and means to rotate said tools.

5. In a cap-soldering machine, a vertically, horizontally, and rotatively movable, suspended soldering tool having an annular operative edge and comprising a vertically extended shank carrying a radial projection containing a downwardly-opening socket; encircling said shank a thereto relatively vertically movable thimble interiorly dimensioned to admit universal horizontal movements of said shank therein; means to prevent said thimble from moving horizontally; horizontally rotatable, independently of said thimble, a gear; carried by said gear an upwardly presented projection dimensioned to engage so loosely within said socket as to permit universal horizontal movements of said radial projection and said gear relatively to each other; means to rotate said gear; means to, by aid of gravity, lower in unison said tool and gear until further descent of the tool is resisted by a can and thereafter to further lower and to raise said gear independently of said tool.

6. In a cap-soldering machine, an uprightly disposed, vertically, horizontally, and rotatively movable soldering tool comprising a vertically extended shank carrying above said tool a part radially projecting from said shank; encircling said shank a thereto relatively vertically movable thimble interiorly dimensioned to admit horizontal movements of said shank therein and means to prevent said thimble from moving horizontally; horizontally rotatable independently of said thimble a gear; connected by a socket and pin connection with said part radially projecting from said shank, the pin being of smaller diameter than the socket.

7. In a cap-soldering machine comprising a plurality of similar vertically disposed soldering tools rotatable in a horizontal plane their vertical axes equally-spaced-apart, a vertically movable carrier; carried by said carrier a like plurality of gas burners each concentric with one of said axes and comprising downwardly-delivering gas vents disposed in a horizontal plane, a gas chamber opening into said vents and oppositely disposed inlets opening into said chamber; in combination with means to vertically move said carrier, and means to supply gas under pressure to said inlets from a common source.

8. In a cap-soldering machine comprising a plurality of similar vertically disposed soldering tools rotatable in a horizontal plane with their vertical axes equally spaced apart a vertically movable carrier; carried by said carrier a like plurality of gas burners each concentric with one of said axes and comprising downwardly-delivering gas vents disposed in a horizontal plane, a gas chamber opening into said vents and oppositely disposed inlets opening into said chamber; also concentric with each burner and communicating with its said inlets, an annular gas chamber, and, opening oppositely into each last mentioned chamber horizontally disposed conduits; in combination with means to vertically move said carrier and means to supply gas under pressure to said conduits from a common source.

9. In a cap-soldering machine comprising a plurality of similar vertically disposed soldering tools rotatable in a horizontal plane with their vertical axes equally-spaced-apart at the rectangular intersections of horizontal straight lines passing through two or more of said axes, a vertically movable carrier carried by said carrier a like plurality of gas burners each concentric with one of said axes and comprising downwardly-delivering gas vents disposed in a horizontal plane, a gas chamber opening into said vents and oppositely disposed inlets opening into said chamber; also, concentric with each burner, and communicating with its said inlets, an annular gas chamber, and, opening oppositely into each last mentioned chamber parallel horizontally disposed conduits connected together by horizontally therewith rectangularly disposed other conduits, in combination with means to vertically move said carrier, and means to supply gas under pressure to said last mentioned conduits from a common source.

10. In a cap-soldering machine comprising a plurality of similar soldering-tools rotatable in a horizontal plane with their vertical axes equally-spaced-apart at the rectangular intersections of horizontal straight lines passing through two or more of said axes, a vertically movable carrier carried by said carrier a like plurality of gas burners each concentric with one of said axes and comprising downwardly-delivering gas vents disposed in a horizontal plane, a gas chamber opening into said vents and oppositely disposed inlets opening into said chamber; also, concentric with each burner, and communicating with its said inlets, an annular gas chamber, and, opening oppositely into each last mentioned chamber parallel horizontally disposed conduits connected together by horizontally therewith rectangularly disposed other conduits; also above said burners, chambers and conduits some poorly heat-conducting material; in combination with means to vertically move said carrier, and means to supply gas under pressure to said last mentioned conduits from a common source.

11. In a cap-soldering machine, comprising a plurality of like vertically movable soldering tools having their operative edges normally disposed in the same horizontal plane, disposed above said edges a thereto relatively vertically movable burner-carrying box having a bottom section comprising good heat conducting material, above said bottom section less heat conductive material, and disposed partly within said bottom section and below said less heat conductive material a like plurality of gas-burners downwardly-delivering from within said bottom section.

12. In a cap-soldering machine comprising a plurality of like vertically movable soldering-tools having their operative edges normally disposed in the same horizontal plane, disposed above said edges a thereto relatively vertically movable burner-carrying box comprising a horizontally disposed heat-conductive bottom section, a plurality of like gas burners disposed within, and venting downwardly from said bottom section, and, disposed above said burners, less conductive material.

13. In a cap-soldering machine, a vertically movable soldering tool having a downwardly presented operative edge; and, disposed above said edge, a thereto, while in operation, relatively vertically movable burner-carrying box comprising a horizontally disposed heat-conductive bottom section, a gas burner disposed within and venting downwardly from said bottom section, and, disposed above said burner, less conductive material in combination with means to, by aid of gravity, lower in unison said box and tool until further descent of the tool is resisted by a can and to, thereafter, during such resistance, lower said box still further, independently of said tool.

14. In a can treating machine of the class described having a pathway for the cans disposed above said pathway a plurality of similar tools operative in a horizontal plane with their vertical axes equally spaced apart at the intersection of horizontal straight lines passing through two or more of said axes, in said pathway a therein movable tray adapted to loosely carry a like plurality of similar cans each of diameter equal to the distance between said axes, transverse said pathway beyond said axes a stop disposed to contact some of said cans and influence them toward positions in which their centers register with said axes, on either side said pathway lateral guide-rails disposed to engage some of said cans and influence them toward said positions, and in front of said axes normally transverse said pathway a bar movable in a circle and disposed to bear against some of said cans and co-acting with said stop and guide-rails to force the entire plurality of cans into said positions.

15. In a cap-soldering machine, a vertically and rotatively movable soldering tool; a vertically movable cap-holding rod; solder heating means; a vertically movable carrier carrying said solder-heating means; means to vertically-movably suspend said carrier; means to, by aid of said carrier, vertically-movably suspend said tool; means to vertically-movably suspend said rod; means to lower in unison said carrier tool and rod until further descent of the rod is resisted by a can, to further lower in unison said carrier and tool until further descent of the tool is resisted by said can, and to thereafter further lower and raise said carrier independently of said tool; and means to rotate said tool.

16. In a cap-soldering machine, a vertically and rotatively movable soldering tool; solder-heating means; a vertically movable carrier carrying said solder-heating means; means to vertically-movably suspend said carrier; means to, by aid of said carrier, vertically-movably suspend said tool; means to lower in unison said carrier and tool until further descent of the tool is resisted by a can, to further lower and to raise said carrier independently of said tool; and means to rotate said tool.

BERNARD HAUSHEER.

Witnesses:
MARY G. LOFTUS,
DAVID F. LEE.

Copies of this patent may be obtained for five cents each, by addressing the "Commissioner of Patents, Washington, D. C."